(12) United States Patent
Cotton, III

(10) Patent No.: US 6,771,005 B2
(45) Date of Patent: Aug. 3, 2004

(54) APPARATUS AND METHOD FOR ADJUSTING THE PRE-LOAD OF A SPRING

(75) Inventor: Clifford E. Cotton, III, Pontiac, IL (US)

(73) Assignee: Caterpillar Inc, Peoria, IL (US)

( * ) Notice: Subject to any disclaimer, the term of this patent is extended or adjusted under 35 U.S.C. 154(b) by 14 days.

(21) Appl. No.: 09/783,367

(22) Filed: Feb. 14, 2001

(65) Prior Publication Data

US 2002/0109435 A1 Aug. 15, 2002

(51) Int. Cl.[7] .............................................. H01L 41/08
(52) U.S. Cl. ...................................................... 310/328
(58) Field of Search ................................. 310/328, 330, 310/368; 251/129.01; H01L 41/09

(56) References Cited

U.S. PATENT DOCUMENTS

| | | | |
|---|---|---|---|
| 4,045,695 A | * 8/1977 | Itagaki et al. ................. | 310/322 |
| 4,567,394 A | 1/1986 | Frisch | |
| 4,836,496 A | 6/1989 | Abujudom et al. | |
| 5,263,324 A | 11/1993 | Herndon | |
| 5,471,721 A | * 12/1995 | Haertling ................... | 29/25.35 |
| 5,589,725 A | * 12/1996 | Haertling ................... | 310/358 |
| 5,780,958 A | 7/1998 | Strugach et al. | |
| 5,831,371 A | * 11/1998 | Bishop ...................... | 310/328 |
| 5,849,125 A | * 12/1998 | Clark ........................ | 156/222 |
| 5,861,702 A | 1/1999 | Bishop et al. | |
| 5,865,418 A | 2/1999 | Nakayama et al. | |
| 5,973,441 A | * 10/1999 | Lo et al. ..................... | 310/330 |
| 6,060,811 A | * 5/2000 | Fox et al. ................... | 310/311 |
| 6,140,745 A | * 10/2000 | Bryant ....................... | 310/353 |
| 6,392,329 B1 | * 5/2002 | Bryant et al. ............... | 310/328 |
| 6,655,654 B1 | * 12/2003 | Cotton et al. ........... | 251/129.06 |
| 6,679,474 B2 | * 1/2004 | Cotton et al. ........... | 251/129.06 |
| 6,695,283 B2 | * 2/2004 | Cotton et al. ........... | 251/129.06 |
| 6,705,588 B2 | * 3/2004 | Forck et al. ............ | 251/129.06 |
| 2001/0043027 A | * 1/1997 | Hellbaum et al. ......... | 310/330 |

FOREIGN PATENT DOCUMENTS

JP          2000-208825      * 7/2000        ........... H01L/41/09

* cited by examiner

*Primary Examiner*—Thomas M. Dougherty
*Assistant Examiner*—Karen Addison

(57) ABSTRACT

A pre-loaded spring mechanism includes a piezoelectric device and a pre-loaded spring operatively connected to the device. A voltage source is coupled to the piezoelectric device to apply a voltage to the device. The applied voltage causes the piezoelectric device to undergo a physical dimensional change that changes the pre-load of the spring. The pre-load of the spring is adjusted by selectively varying the voltage applied to the piezoelectric device.

14 Claims, 1 Drawing Sheet

APPARATUS AND METHOD FOR ADJUSTING THE PRE-LOAD OF A SPRING

TECHNICAL FIELD

The present invention relates generally to pre-loaded spring mechanisms or assemblies and, more particularly, to a method and apparatus for adjusting the pre-load of a spring in a pre-loaded spring mechanism.

BACKGROUND

Springs are used in assemblies and mechanisms as a device for storing energy as a function of displacement. Energy is supplied to, and stored in, the spring by applying a force through a suitable mechanism to compress the spring. The stored energy is released from the spring by allowing it to extend through a displacement. This energy may be used as a source for motive power (including return motion), shock absorbers, vibration control, force measurement, and the like.

Often, mechanisms or assemblies that include a spring are designed to pre-load the spring to a desired pre-load setting as may be required for a particular application. Thus, the pre-loaded spring mechanism typically includes one or more structural elements that apply an axial force to the spring to compress the spring to the desired pre-load setting. In the example of an armature used to close a valve, if the pre-load of the spring is too high or too low, the armature may unexpectedly close the valve, or may fail to close the valve when doing so is necessary. In some instances, a device may have several springs, each of which should have a similar pre-load. However, each spring will exhibit its own spring characteristic and it is therefore extremely difficult to assemble a mechanism wherein all springs will have an equal pre-load. However, equal pre-loads in the multiple springs of such a mechanism may be necessary for proper and efficient operation of the device.

Since manufacturing springs with identical spring characteristics is not practical, pre-loaded spring mechanisms in the past have accounted for variations in spring pre-load by swapping shims of different thicknesses or by incorporating adjustable set screws that vary the compression of the spring. The drawbacks of these spring pre-load adjustment methods is that the assembly must be disassembled to accomplish this task, and the pre-load adjustment process is typically time consuming and inefficient.

SUMMARY OF THE INVENTION

While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, an apparatus and method are provided for adjusting the pre-load of a spring in a pre-loaded spring mechanism. The pre-loaded spring mechanism includes a piezoelectric device operatively coupled to a pre-loaded spring. A voltage source is operatively coupled to the piezoelectric device to apply a voltage to the device. The applied voltage causes the piezoelectric device to undergo a physical dimensional change that changes the pre-load of the spring. The pre-load of the spring is adjusted by selectively varying the voltage applied to the piezoelectric device. Different voltages can be applied to different piezoelectric devices in a spring mechanism having multiple pre-loaded springs so that each spring exhibits generally the same spring pre-load.

BRIEF DESCRIPTION OF THE DRAWINGS

For a better understanding of the present invention, reference may be made to the accompanying drawings in which.

DETAILED DESCRIPTION

Figure 1:
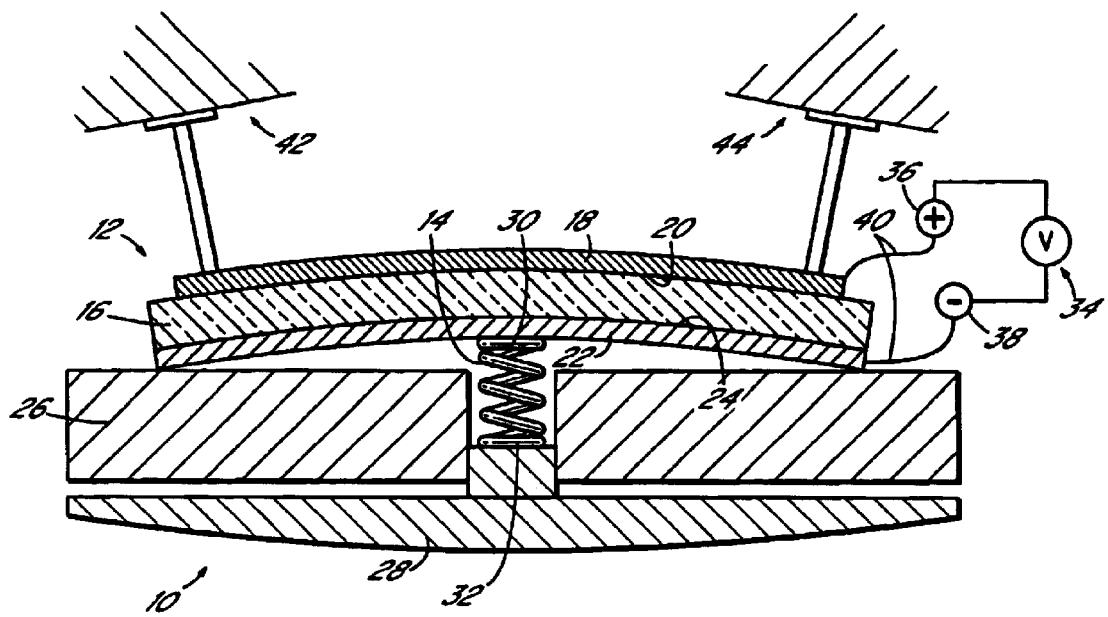
FIG. 1 is a diagrammatic cross-sectional view of a pre-loaded spring mechanism in accordance with one embodiment of the present invention.

With reference to the figures, and to FIG. 1 in particular, a pre-loaded spring mechanism 10 is shown in accordance with one embodiment of the present invention. Mechanism 10 includes a piezoelectric device 12, such as a thermally pre-stressed bender actuator, and a spring 14 coupled with the device 12. In one embodiment, the piezoelectric device 12 includes an electroactive layer 16, such as a ceramic wafer, that is thermally prestressed into an arcuate structure, as shown in FIG. 1. Suitable materials for this piezoelectric device 12 include those containing piezoelectric or electrostrictive materials such as lead, zirconate, titanate (PZT), lead lanthanum zirconate titanate (PLZT), lead stanate zirconate titanate (PSZT), lead barium zirconate titanate (PBZT) and lead magnesium niobate (PMN) as well as any other suitable electroactive material.

A first electrode 18 is applied to an upper surface 20 of the electroactive layer 16 and a second electrode 22 is applied to a lower surface 24 of the electroactive layer 16. Electrodes 18, 22 are deposited or applied to the upper and lower surfaces 20, 24, respectively, of the piezoelectric device 12 by any suitable method known to those skilled in the art, such as screen printing, spraying, painting or vacuum deposition, and may include any suitable conductive material. The terms "upper" and "lower" are used herein to simplify description of the present invention, and are not intended to limit the scope of the present invention in any way as other orientations of the piezoelectric device 12 are possible without departing from the spirit and scope of the present invention.

In the illustrative embodiment of FIG. 1, the piezoelectric device 12 is shown in combination with the spring 14 in a solenoid-controlled valve arrangement having a solenoid 26 that is operable to move an armature 28 relative to a valve orifice (not shown). Although this illustrative operating environment for the piezoelectric device 12 is shown by way of example, those skilled in the art will appreciate that the device 12 of the present invention may be used in many different spring mechanisms without departing from the spirit and scope of the present invention.

In the illustrative example, the piezoelectric device 12 is coupled with one end 30 of the spring 14. The spring end 30 may be coupled with or attached to the piezoelectric device 12 or, alternatively, may simply engage or contact a surface of the device 12. The spring 14 is coupled at its opposite end 32 with the armature 28. In this way, the spring 14 may be compressed from its free standing length to be pre-loaded between the device 12 and the armature 32.

A voltage source 34 is coupled with the first and second electrodes 18, 22 of the piezoelectric device 12 and is used to apply a voltage to the device 12. The applied voltage causes the piezoelectric device 12 to undergo a physical dimensional change by either doming or flattening in a direction parallel to the longitudinal axis of the spring 14. Depending on the extent of the doming or flattening of the piezoelectric device 12, which may be adjusted by selectively increasing or decreasing the applied voltage to the device 12, the length of the spring 14 may be variably compressed or extended to adjust the pre-load of the spring. By this combination of the piezoelectric device 12 and the spring 14, multiple springs of a pre-loaded spring mechanism may each be adjusted to exhibit identical pre-loads by selectively varying the voltage applied to each device 12.

More specifically, the first and second electrodes 18, 22 are connected to positive and negative terminals 36, 38 of voltage source 34 that is operable to energize and cause bending movement of the piezoelectric device 12 as is known in the art. Although the illustrated embodiment of the present invention is depicted as only having one electroactive layer 16 and a pair of electrode layers 18, 22, the piezoelectric device 12 may comprise a stacked arrangement having multiple electroactive and electrode layers. Wire leads 40 couple the terminals 36, 38 with the electrodes 18, 22 to provide electrical contact to the device. The voltage source 34 is used to apply voltage to the device. When a DC voltage is applied to the piezoelectric device 12, the electroactive layer 16 will undergo physical deformation by either doming or flattening in a direction parallel to the longitudinal axis of the spring 14 to adjust the pre-load of the spring 14.

The piezoelectric device 12 is positioned to be coupled with the end 30 of the spring 14. Once placed under any degree of compression, the spring 14 will exhibit a particular pre-load. The piezoelectric device 12 may be coupled with rigid clamps 42, 44 which comprise a support structure to hold the actuator 12 in a fixed position relative to the solenoid 26, armature 28 and spring 14. Other types of support structures known to those skilled in the art may also be used. By selectively varying the voltage applied to the piezoelectric device 12, a varying force is applied to the spring 14 through the displacement of the piezoelectric device 12 that adjusts the pre-load of the spring to a desired setting. For example, by selectively increasing the voltage applied to device 12 thereby causing the piezoelectric device 12 to flatten, and thereby apply an increased force to the spring 14, the spring pre-load setting may be increased. Conversely, by selectively decreasing the voltage applied to device 12 thereby causing the piezoelectric device 12 to increase its degree of doming, the spring pre-load setting may be decreased. In other embodiments, the reverse may be true, depending on the configuration of the piezoelectric device 12 and the spring 14.

Figure 2:
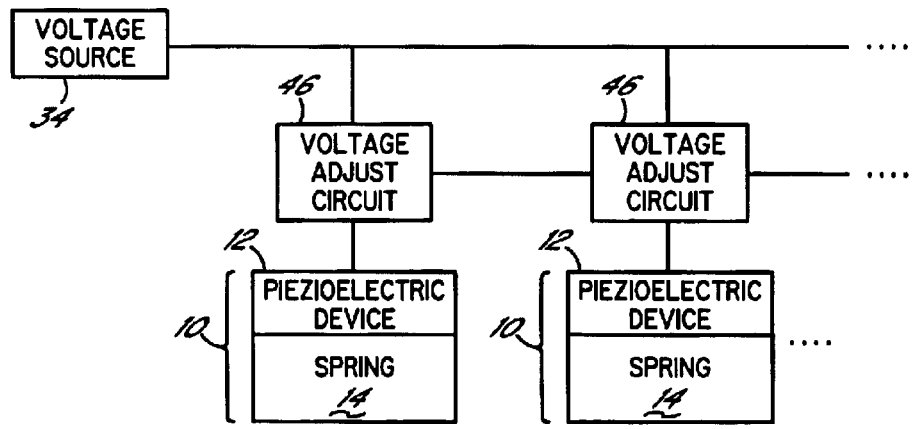
FIG. 2 is a schematic diagram of a pre-loaded spring mechanism in accordance with one embodiment of the present invention.
Figure 3:
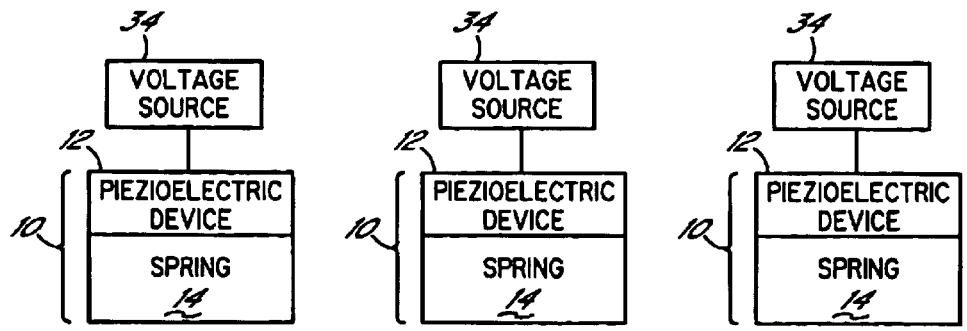
FIG. 3 is a view similar to FIG. 2 of a pre-loaded spring mechanism in accordance with one embodiment of the present invention.

Referring now to FIGS. 2 and 3, in pre-loaded spring mechanisms having multiple pre-loaded springs, it is contemplated that in one embodiment of the invention, a single voltage source 34 may be used to provide voltage to each piezoelectric device 12 in a device having multiple pre-loaded spring mechanisms 10. According to the embodiment of FIG. 2, a voltage adjust circuit 46 may be coupled between the voltage source 34 and a respective one of the piezoelectric devices 12 in a pre-loaded spring mechanism 10. The voltage adjust circuit 46 may be a manually controlled potentiometer, for example, that is adjusted to selectively vary the voltage applied to a piezoelectric device 12 of a respective pre-loaded spring mechanism 10 to set the respective spring 14 to a desired pre-load setting. Alternatively, the voltage adjust circuit 46 may be an analog or digitally controlled potentiometer, for example, that receives a control signal from a control source (not shown) to selectively vary the voltage applied to the piezoelectric device 12. Of course, it will be understood that voltage adjust circuits 46 could take many other forms as well that are capable of selectively varying the voltage applied to each respective piezoelectric device 12. In accordance with the embodiment of FIG. 2, the multiple voltage adjust circuits 46 are capable of applying different voltages to the multiple pre-loaded spring mechanisms 10 so that each spring 14 may have a predetermined pre-load. Thus, by appropriately controlling the position of the piezoelectric devices 12, the performance characteristics of each spring 14 may be controlled, and the variation in the spring 14 due to manufacture may be compensated for, or even exaggerated. Thus, multiple springs 14 could be controlled so as to exhibit a nearly identical pre-load.

In another embodiment of the invention, as shown in FIG. 3, a separate voltage source 34 may be coupled to each pre-loaded spring mechanism 10 to selectively vary the voltage applied to each piezoelectric device 12. The voltage sources 34 would be capable of applying different voltages to the respective piezoelectric devices 12 in the pre-loaded spring mechanisms 10 so that each spring 14 exhibits generally the same spring pre-load or other predetermined pre-load.

Industrial Applicability

With reference to the figures and in operation, a piezoelectric device 12, such as a thermally prestressed bender actuator, is provided in a pre-loaded spring mechanism 10.

By selectively varying the voltage applied to the piezoelectric device 12, the pre-load of the spring 14 can be adjusted. Different voltages can be applied to different piezoelectric devices 12 in a pre-loaded spring mechanism having multiple pre-loaded springs so that each spring exhibits generally the same spring pre-load or some other predetermined pre-load.

The springs 14 may be coupled with other moveable devices (not shown) that have varying inertial characteristics. By appropriate selection of the pre-load for the respective springs 14, to compensate, each of the devices may perform similarly for a given stimulus, e.g. have net inertial properties that are substantially similar.

Other aspects and features of the present invention can be obtained from a study of the drawings, the disclosure and the appended claims.

From the foregoing, it will be appreciated that, although specific embodiments of the invention have been described herein for purposes of illustration, various modifications may be made without deviating from the spirit or scope of the invention. Accordingly, the invention is not limited except as by the appended claims.

What is claimed is:

1. A spring biased mechanism comprising:

a moveable element;

a biasing spring operably coupled to bias said element toward a predetermined position with a spring preload force;

a spring preload force adjuster including a piezoelectric device operably coupled to said spring; and said spring preload force being at least partially a function of a voltage applied to said piezoelectric device, but said piezoelectric device being inoperable to move said moveable element.

2. The mechanism of claim 1, including an electrical actuator operably coupled to said moveable element in opposition to said biasing spring.

3. A spring biased mechanism comprising:
   a moveable element;
   a biasing spring operably coupled to bias said element toward a predetermined position with a spring preload force;
   a spring preload force adjuster including a piezoelectric device operably coupled to said spring;
   said spring preload force being at least partially a function of a voltage applied to said piezoelectric device;
   an electrical actuator operably coupled to said moveable element in opposition to said biasing spring; and
   said electrical actuator includes a solenoid with an armature coupled to move with said moveable element.

4. The mechanism of claim 3 wherein said moveable element includes a valve member in contact with a valve seat at said predetermined position.

5. A method of adjusting a spring biased mechanism, comprising the steps of:
   biasing a moveable element toward a predetermined position at least in part with a spring having a spring preload force; and
   adjusting the spring preload force at least in part by adjusting a voltage applied to a piezoelectric device operably coupled to the spring.

6. The method of claim 5 wherein said moveable element includes a valve member in contact with a valve seat at said predetermined position.

7. The method of claim 5 including a step of moving said moveable element away from said predetermined position at least in part by energizing an electrical actuator operably coupled to said moveable element.

8. A system comprising:
   a plurality of spring biased mechanisms, each having a biasing spring operably coupled to bias a moveable element toward a predetermined position with a spring preload force;
   each of said mechanisms including a spring preload force adjuster that includes a piezoelectric device operably coupled to said spring; and
   said spring preload force being at least partially a function of a voltage applied to said piezoelectric device, but said piezoelectric device being inoperable to move said moveable element.

9. The system of claim 8 including a common electrical circuit electrically connected to each said piezoelectric device.

10. The system of claim 9 wherein each of said spring biased mechanisms includes an electrical actuator operably coupled to said moveable element in opposition to said biasing spring.

11. A system comprising:
    a plurality of spring biased mechanisms, each having a biasing spring operably coupled to bias a moveable element toward a predetermined position with a spring preload force;
    each of said mechanisms including a spring preload force adjuster that includes a piezoelectric device operably coupled to said spring;
    said spring preload force being at least partially a function of a voltage applied to said piezoelectric device;
    a common electrical circuit electrically connected to each said piezoelectric device;
    each of said spring biased mechanisms includes an electrical actuator operably coupled to said moveable element in opposition to said biasing spring; and
    each said electrical actuator includes a solenoid with an armature coupled to move with said moveable element.

12. The system of claim 11 wherein each said moveable element includes a valve member in contact with a valve seat at said predetermined position.

13. The mechanism of claim 2 wherein said piezoelectric device, said spring and said electrical actuator are arranged in series.

14. The mechanism of claim 13 wherein said piezoelectric device, said spring and said electrical actuator are aligned.

* * * * *